Feb. 27, 1951 W. F. MERCIER 2,543,638
LUBRICATOR FOR MOVING CONVEYER CHAINS
Filed Aug. 17, 1948 3 Sheets-Sheet 1
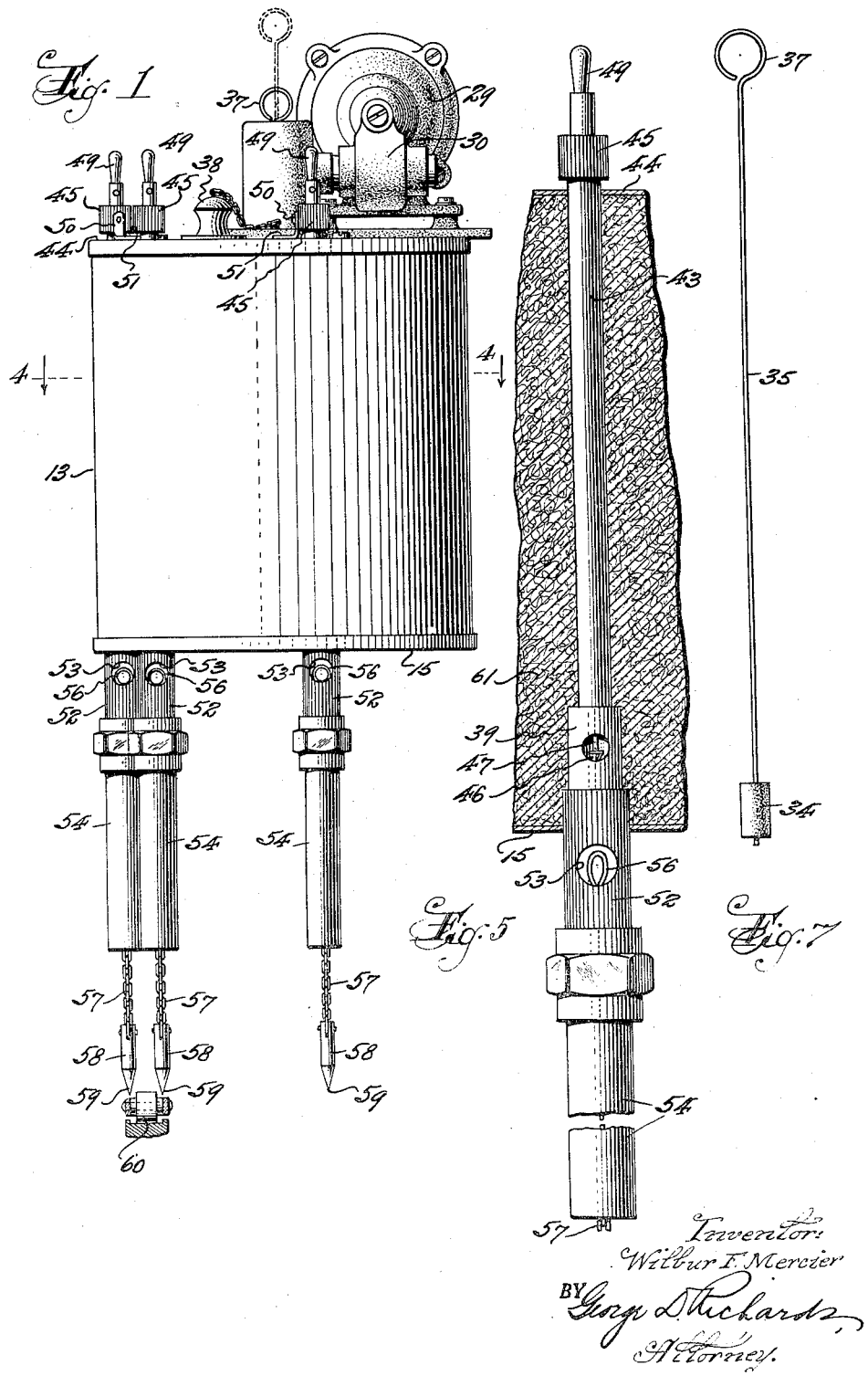

Feb. 27, 1951 W. F. MERCIER 2,543,638
LUBRICATOR FOR MOVING CONVEYER CHAINS
Filed Aug. 17, 1948 3 Sheets-Sheet 2
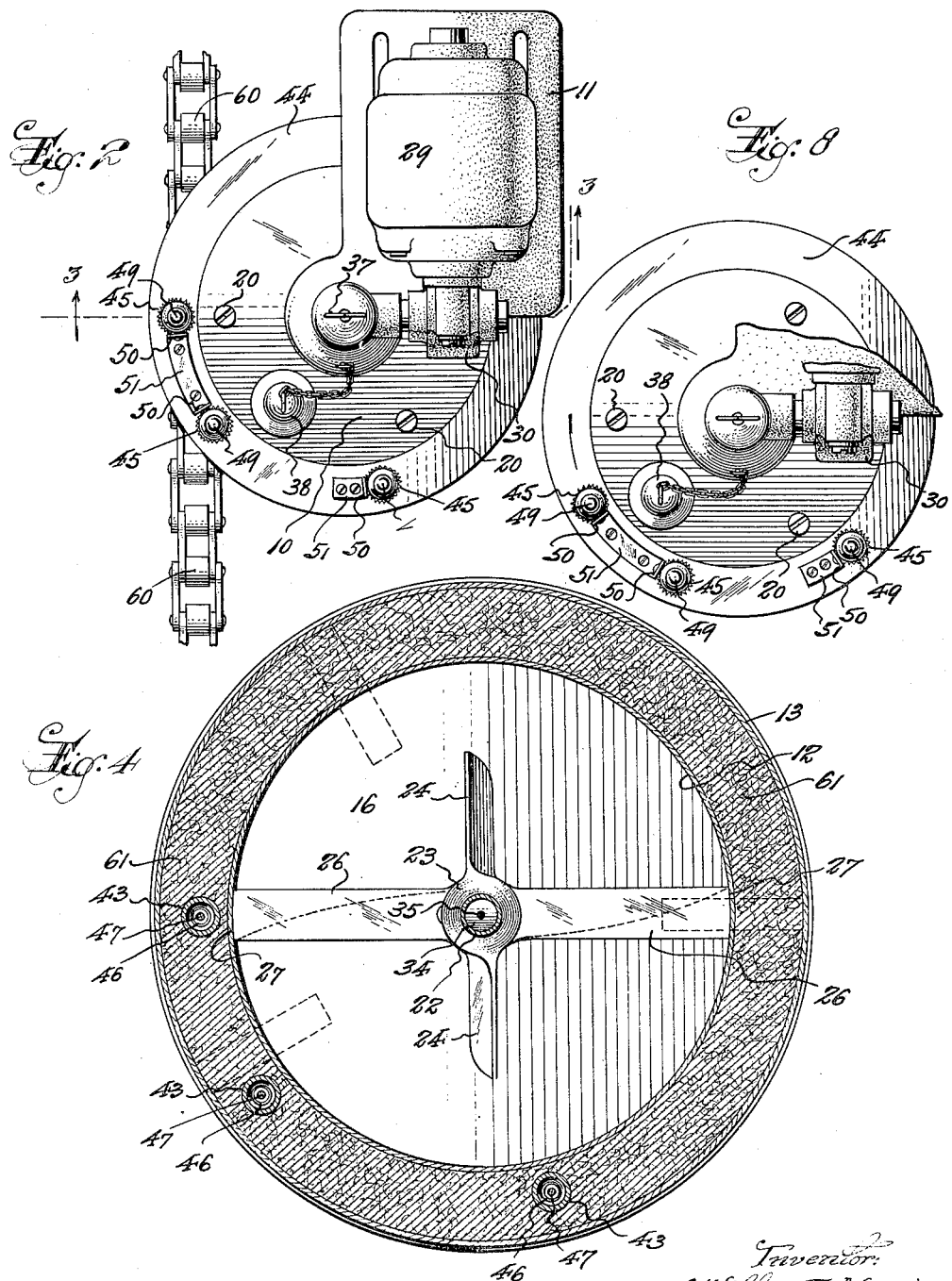

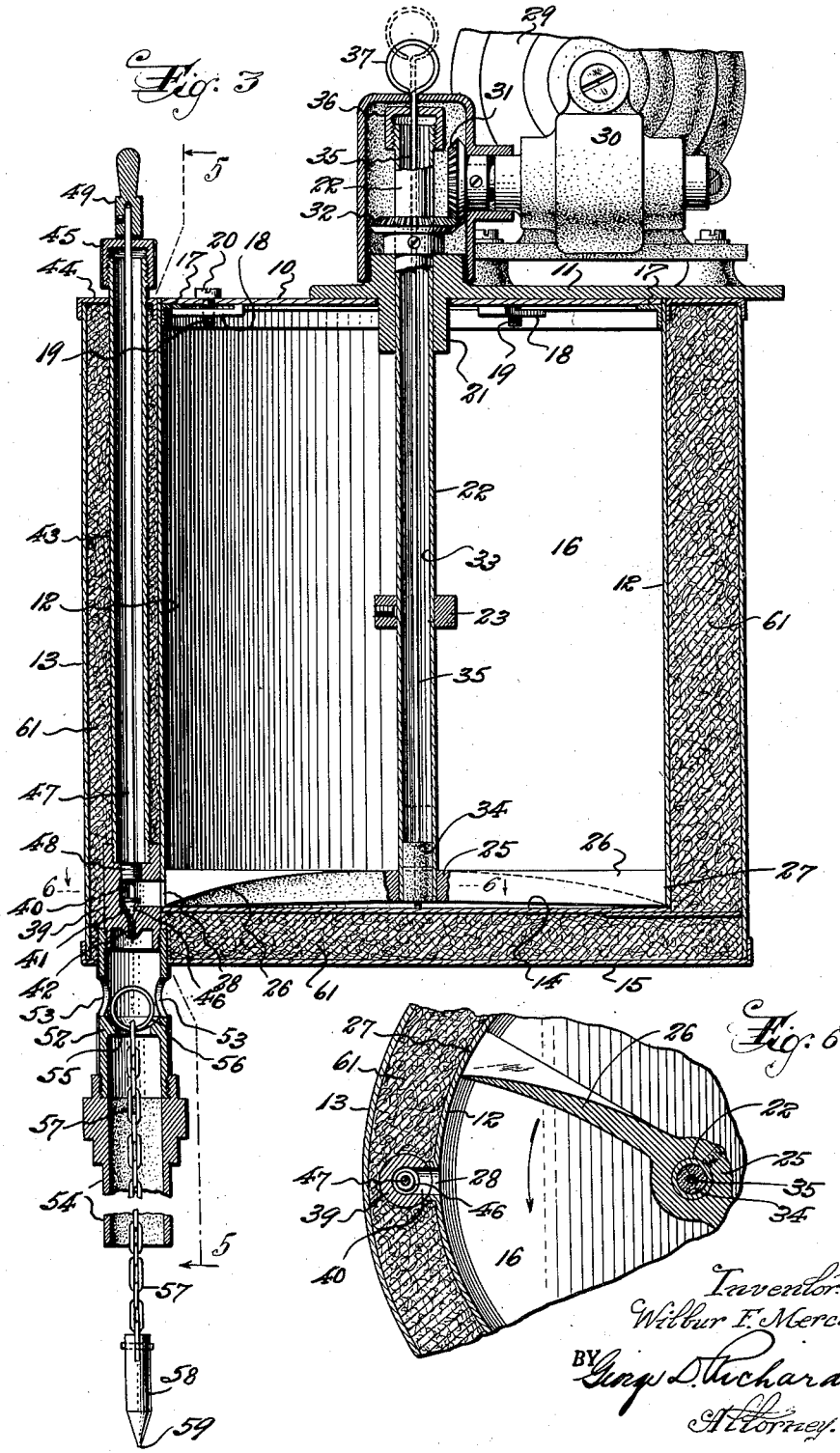

Patented Feb. 27, 1951

2,543,638

UNITED STATES PATENT OFFICE 2,543,638

LUBRICATOR FOR MOVING CONVEYER CHAINS

Wilbur F. Mercier, Detroit, Mich., assignor to Bel-Ray Company, Inc., Madison, N. J., a corporation of New Jersey Application August 17, 1948, Serial No. 44,750

16 Claims. (Cl. 184—15)

1

This invention relates to lubricating devices; and the invention has reference, more particularly, to a gravity feed lubricator which is especially adapted to supply, to running chains or other mechanism, a lubricant comprising flake graphite suspended in a fluid vehicle such as an oil.

For the lubrication of moving conveyer chains generally, and especially for the lubrication of conveyer chains used in connection with baking and other heat treating ovens, it is desirable to use graphite or a lubricant containing graphite. In many cases a graphite and oil mixture is daubed on the moving conveyer chains or similar mechanisms to be lubricated, but this is not altogether satisfactory because it usually requires hand application with risk that parts may be skipped, and uniform deposit of the lubricant is not assured. There is therefore a need for a lubricator which will automatically feed a graphite containing lubricant by gravity, in a regular and uniform manner, onto a moving conveyer chain or similar mechanism. Owing to the fact that a flowable graphite lubricant comprises a suspension of graphite particles in a liquid vehicle, such e. g. as an oil of suitable viscosity, the graphite content of such lubricant, when the lubricant stands in a supply reservoir, tends to precipitate or fall out of suspension, and thus collects as a thick, substantially non-flowable mass in the bottom of the reservoir. Such mass of precipitated graphite is not only practically non-flowable, but also tends to clog or choke off the discharge outlet of the reservoir. For these reasons a satisfactory automatic lubricator must overcome these obstacles.

Having the above in view, it is an object of this invention to provide a novel construction of lubricant discharge means which is adapted to dispense a suspended graphite lubricant, and which is operative to automatically feed such lubricant in a steady and uniform manner for application to moving conveyor chains or similar mechanisms, or for delivery to moving parts of other types of mechanism desired to be lubricated by a suspended graphite lubricant.

The invention has for additional objects to provide a novel lubricant supply reservoir provided with regulatable discharge means and internal means for agitating the suspended graphite content of the reservoir so as to maintain the same in a substantially free flowing condition.

Another object of the invention is to provide the lubricator with an adjustably supported lubricant supply reservoir having a plurality of lubricant feeding discharge means, relative spacing of which may be easily adjusted to operatively accommodate the same to various widths of chains by merely rotating the reservoir about its vertical axis relative to its support.

Another object is to provide, in connection with the feeding discharge means of the lubricator, novel applicator means for contacting a chain so as to apply the lubricant thereto.

A further object of the invention is to provide means for insulating the lubricant supply reservoir from heat radiated from an adjacent oven, furnace or other heat source, whereby to reduce evaporative losses of volatiles in the lubricant mixture.

Other objects of this invention, not at this time more particularly enumerated, will be understood from the following detailed description of the same.

An illustrative embodiment of this invention is shown in the accompanying drawings, in which:

Fig. 1 is a side elevational view of the novel lubricator; Fig. 2 is a top end plan view of the same; Fig. 3 is a vertical longitudinal section taken on line 3—3 in Fig. 2, but drawn on an enlarged scale; Fig. 4 is a horizontal sectional view taken on line 4—4 in Fig. 1, but drawn on an enlarged scale; Fig. 5 is a fragmentary vertical longitudinal section taken on line 5—5 in Fig. 3; Fig. 6 is a fragmentary horizontal section taken on line 6—6 in Fig. 3; Fig. 7 is a detail view of a lubricant level indicating float with which the lubricator is provided; and Fig. 8 is a top end plan view similar to that of Fig. 2, but showing the reservoir rotatively shifted for adjusting the relative spacing of operative lubricant feeding discharge means to accommodate the same for cooperation with a wider chain.

Similar characters of reference are employed in the above described views, to indicate corresponding parts.

In an illustrative form thereof, as shown in the drawings, the novel lubricator comprises a circular top or cover plate 10 which is suitably affixed to the underside of a carrier bracket 11. Said carrier bracket is adapted to be detachably secured to suitable supporting means (not shown), whereby the lubricator is supported at a desired place of service. Suspended from said top or cover plate 10 is a reservoir member which is formed by spaced inner and outer side walls 12 and 13 and spaced upper and lower bottom walls 14 and 15, the interior walls defining a lubricant holding chamber 16. Affixed to the inner side wall 12, adjacent to the upper open end of the chamber 16, is an annular internal coupler ledge 17. The circular top or cover plate 10 fits within the upper open end of the chamber 16, so as to bear upon said coupler ledge 17. The reservoir member is detachably held in suspended connection with said top or cover plate 10 by retainer clips 18, end portions of which engage under the coupler ledge 17. The retainer clips 18 are threaded onto the shanks 19 of fastening screws 20 with which the top or cover plate 10 is provided. The fastening screws 20, when turned in proper direction, draw up the retainer clips 18 into tight gripping relation to the coupler ledge 17, whereby to securely hold the reservoir member both suspended from said top or cover plate 10, and against rotative displacement from a selected rotatively adjusted relation to the latter. When, however, it is desired to rotatively adjust the reservoir member relative to the top or cover plate 10, for purposes hereinafter more fully explained, the fastening screws 20 may be turned in the opposite direction so as to relax the grip of the retainer clips 18 upon the coupler ledge 17, and thus free the reservoir member for desired rotative adjusting shift.

The carrier bracket 11 is provided with a bearing member 21, the lower portion of which extends centrally through the top or cover plate 10 so as to be aligned with the vertical axis of the chamber 16 provided by the reservoir member. Journaled in said bearing member 21 is a hollow shaft 22 which extends axially downward through the lubricant holding chamber 16 provided by the reservoir member. Fixed on said shaft 22, so as to be revolved thereby within the chamber 16, intermediate the top and bottom of the latter, is an agitator member 23 having radial paddle blades 24 of suitable shape. Fixed on the bottom end of said shaft 22, so as to be revolved thereby contiguous to the bottom or floor of the chamber 16 of the reservoir member, is a combined agitator and lubricant discharge member 25 having radial blades 26. Said blades 26 extend to the wall 12 of the reservoir member, with their ends 27 slidingly abutting the wall surface, and said blades 26 are also so pitched as to incline downwardly from their leading edges to their trailing edges; all whereby to move the lubricant mixture at the bottom of the chamber 16 toward outlet ports 28 with which the inner wall 12 of the reservoir member is provided, as well as to exert an out squeezing pressure upon said lubricant mixture which is calculated to force the same outwardly through the outlet ports 28 for delivery to lubricant feeding discharge means to be presently described.

Preferably, the hollow shaft 22, with its agitator members 23 and 25, is power driven, and, to this end, an electric motor 29 is mounted upon the carrier bracket 11 to serve as a power source. The power of said motor 29 is transmitted, through suitable reduction gearing contained in a gear box 30, to a driver bevel gear 31. Said driver bevel gear 31 meshes with a driven gear 32 which is fixed on the external upper end portion of the shaft 22 so as to drive the latter.

Vertically movable in the endwise open passage 33 provided by the interior of said hollow shaft 22 is a float 34. Affixed to and extending upwardly from said float 34 is an indicator rod 35 which slidably extends through a perforated cap 36 mounted on the upper exterior extremity of the shaft 22. The exteriorly projecting end of said indicator rod 35 preferably terminates in a loop formation 37. Said float and rod provide means adapted to be buoyed by the lubricant mixture content of the chamber 16, of the reservoir member, whereby to indicate the level thereof and consequently the quantity contained in said chamber.

The top or cover plate 10 is provided with a filling opening which is normally closed by a removable closure plug 38.

The reservoir member is provided with a plurality of regulatable lubricant discharge devices which are circumferentially spaced along the sides thereof and so as to terminate in applicator means dependent from the bottom of said reservoir member. Said lubricant discharge devices each comprise a valve housing member 39 which is suitably joined, as by welding, to the inner side wall 12 of the reservoir member so as to be disposed between said inner side wall 12 and the outer side wall 13 adjacent the bottom of the reservoir member. The valve housing chamber 39 is provided, intermediate its ends, with a laterally open valve chamber 40, the open side of which is registered with an outlet port 28 of the reservoir member, so as to communicate therewith. Formed in the lower end portion of the valve housing member 39 is a valve seat 41 which terminates in a downwardly directed discharge port 42. Connected with the upper end portion of the valve housing member 39, to extend upwardly therefrom through the space between the inner side wall 12 and outer side wall 13 of the reservoir member, is a tubular valve housing extension 43. The upper end of said housing extension 43 projects externally from the top of the reservoir member through an annular top wall 44 which closes the space intermediate the inner and outer side walls 12 and 13. The exterior upper end portion of said housing extension 43 is externally screw-threaded to receive a perforate stop cap 45 which is adjustably threaded thereon. Cooperative with the valve seat 41 and discharge port 42 is a valve member 46, the stem 47 of which is provided with a screw-threaded regulator section 48 which is threaded through the upper end portion of the valve housing member 39. Said valve stem 47 extends upwardly through the housing extension 43 to project through and exteriorly of the perforate stop cap 45. Suitably affixed to the external end of said valve stem is a finger piece 49 by which the valve member may be manipulated for adjustment relative to the valve seat 41 and discharge port 42.

By turning of the valve stem 47 with its threaded regulator section 48 in proper direction, the valve member 46 may be raised a desired distance from the valve seat 41 so as to open the discharge port 42 to permit a desired regulated discharge flow of lubricant mixture through said discharge port. When the valve member 46 is thus opened and adjusted, the stop cap 45 may be turned up to abut the fingerpiece 49, and thereby to lock the valve stem and valve member against accidental displacement from its adjusted relation to the discharge port 42. The circumferential side surface of said stop cap 45 is serrated so as to be engaged by a spring detent finger 50, which is affixed to the top wall 44 of the reservoir member by a base portion 51, thus preventing accidental rotative displacement of the stop cap from its valve locking position.

While I have shown and above described, by way of illustration, one form and construction of regulatable lubricant mixture discharge valve means, it will be understood that various other forms and arrangements thereof known to the art may be utilized if desired.

Coupled to the discharge end of each discharge valve means is an applicator device for applying the discharged lubricant mixture to a running chain or other mechanism desired to be supplied with the lubricant mixture. Each said applicator device comprises a sight cage 52 which is threaded onto the lower end of a valve housing member 39 so as to depend therefrom in downward extension from the bottom end of the reservoir member. Said sight cage 52 is provided, in opposite side walls thereof, with sight openings 53 through which the flow discharge or drop emission of lubricant mixture from the discharge port 42 may be observed, whereby to facilitate manipulation of the valve means for regulating lubricant emission in desired amount or in desired drop frequency. Threaded onto the lower end of the sight cage 52, to extend axially downward therefrom toward the chain or other mechanism to be lubricated, is a tubular nipple 54. The sight cage 52 is provided with an internal annular shoulder 55 below the level of its sight openings 53. Engaged on and supported by said shoulder 55 is the anchor ring or loop 56 of a lubricant guide means 57, which is preferably furnished in the form of a link chain. Said guide means or chain 57 extends downwardly through the nipple 54 so as to hang from the lower end thereof, and attached to the lower end of said guide means or chain 57 is an applicator finger 58 having a pointed extremity 59. In operation, the lubricator device is so positioned above a running transmission chain 60, which is desired to be lubricated thereby, that the dependent applicator finger 58 is disposed with its pointed extremity 59 directed toward and so as to drop the lubricant mixture therefrom onto the link joints of a side of the transmission chain 60.

Since the plurality of lubricant discharge devices, with which the lubricator device is provided, are circumferentially spaced around and dependent from the bottom of the reservoir member, any two of the same may be operatively related to opposite sides of a given transmission chain 60. The relative spacing of the selected two discharge devices, to be used for lubricant mixture service to the chain 60, may be arranged to accommodate the width of said chain by rotating the body of the reservoir member on its supporting top or cover plate 10 and about its vertical axis until their respective applicator fingers 58 are aligned with and directed toward the paths of movement of chain link joints of the respective sides of the chain 60 to be served (see Fig. 1). Once such adjustment is attained, the reservoir member is secured against rotative displacement relative to the top or cover plate 10 in the manner hereinabove already described. Thereafter the discharged lubricant mixture will run down the guide means or chains 57 and applicator fingers 58 so as to drop from the extremities 59 of the latter directly onto the chain link joints, as the running transmission chain 60 moves along beneath the lubricator device. In this manner, uniform and adequate lubrication of the running chain 60 is assured.

It frequently happens that the lubricator devices must be located adjacent to hot apparatus, such e. g. as an oven in connection with which a transmission chain 60 is used. When so located the lubricator devices are subjected to effects of heat radiated from the oven or other heat source, with the risk of evaporation and detrimental loss of volatiles contained in the lubricant mixture with which the lubricator devices are charged. To prevent this, the reservoir member is provided with the double wall construction above described, and packed into the space between the walls, and so as to surround the valve housing members 39 and their extensions 43 is a suitable heat insulating material 61, such e. g. as a magnesia insulation.

In operation, the chamber 16 of the reservoir member having been filled with a lubricant mixture comprising graphite suspended in a liquid vehicle, such e. g. as an oil of suitable viscosity, the motor 29 is started whereby the agitator members 23 and 25 are revolved. The movement of the agitator members through the lubricant mixture, stirs and keeps the latter in motion so that the graphite is maintained in uniform suspension in the liquid vehicle, and is prevented from precipitating to and collecting in the bottom of the chamber 16. The valves of the selected discharge devices having been opened and suitably adjusted, the lubricant mixture, as moved by the blades 26 of the agitator and discharge member 25, is forced outwardly through the discharge ports 28 and through the open valves of the discharge devices, to move thence, under gravity, along the guide means or chains 57 and applicator fingers 58, to thence drip from the extremities 59 of the latter onto the link joints of the transmission chain 60 served by the lubricator. The motor 29 may optionally drive the agitator members continuously or intermittently, as may, in any given case, be deemed desirable.

While it is preferable to actuate the agitator members by power, such as that provided by the motor 29, in a simpler arrangement, the motor 29 may be dispensed with and the shaft 22 of the agitator members may be rotated from time to time by hand, and by means of a hand crank (not shown) suitably secured to the external end of said shaft.

I am aware that changes could be made in the forms and arrangements of parts shown in the drawings and above described, and consequently it is intended that the disclosure of said drawings and description shall be interpreted as illustrative and not in a limiting sense, except as may be required by the scope of the herefollowing claims.

Having now described my invention, I claim:

1. A lubricator comprising a reservoir member, a stationary top plate and support therefor from which said reservoir member is suspended subject to rotative adjustment about its vertical axis, revolvable lubricant agitator and impeller means within the reservoir member, a plurality of circumferentially spaced valve controlled lubricant discharge devices leading from the bottom interior of said reservoir member, said agitator and impeller means being adapted to impel lubricant outwardly through the discharge devices and lubricant applicator means dependent from the outlet ends of said discharge devices along which discharged lubricant may flow by gravity to a place of use, rotative adjustment of said reservoir member being operative to space selected lubricant discharge devices and the applicator means dependent therefrom relative to correspondingly spaced points to which the lubricant is desired to be delivered.

2. A lubricator comprising a reservoir member, a stationary top plate and support therefor from which said reservoir member is suspended subject to rotative adjustment about its vertical axis, revolvable lubricant agitator and impeller means within the reservoir member, a plurality of circumferentially spaced valve controlled lubricant discharge devices leading from the bottom interior of said reservoir member, said agitator and impeller means being adapted to impel lubricant outwardly through the discharge devices, lubricant applicator means dependent from the outlet ends of said discharge devices along which discharged lubricant may flow by gravity to a place of use, rotative adjustment of said reservoir member being operative to space selected lubricant discharge devices and the applicator means dependent therefrom relative to correspondingly spaced points to which the lubricant is desired to be delivered and an insulating jacket enveloping said reservoir member.

3. A lubricator comprising a reservoir member, a top plate from which said reservoir member is suspended subject to rotative adjustment about its vertical axis, a supporting bracket means to which said top plate is affixed, a rotatable shaft journaled in said supporting bracket means to extend axially downward through the reservoir member interior, an upper agitator means affixed to said shaft, a bottom agitator and impeller means affixed to the lower end of said shaft, and a plurality of circumferentially spaced valve controlled lubricant discharge devices leading from the bottom interior of said reservoir member, said bottom agitator and impeller means being adapted to impel lubricant outwardly through said discharge devices.

4. A lubricator comprising a reservoir member, a top plate from which said reservoir member is suspended subject to rotative adjustment about its vertical axis, a supporting bracket means to which said top plate is affixed, a rotatable shaft journaled in said supporting bracket means to extend axially downward through the reservoir member interior, an upper agitator means affixed to said shaft, a bottom agitator and impeller means affixed to the lower end of said shaft, a plurality of circumferentially spaced valve controlled lubricant discharge devices leading from the bottom interior of said reservoir member, said bottom agitator and impeller means being adapted to impel lubricant outwardly through said discharge devices, and lubricant applicator means dependent from the outlet ends of said discharge devices along which discharged lubricant may flow by gravity to a place of use.

5. A lubricator comprising a reservoir member, a top plate from which said reservoir member is suspended subject to rotative adjustment about its vertical axis, a supporting bracket means to which said top plate is affixed, a rotatable shaft journaled in said supporting bracket means to extend axially downward through the reservoir member interior, an upper agitator means affixed to said shaft, a bottom agitator and impeller means affixed to the lower end of said shaft, a plurality of circumferentially spaced valve controlled lubricant discharge devices leading from the bottom interior of said reservoir member, said bottom agitator and impeller means being adapted to impel lubricant outwardly through said discharge devices, and an insulating jacket enveloping the sides and bottom of said reservoir member.

6. A lubricator comprising a reservoir member, a top plate from which said reservoir member is suspended subject to rotative adjustment about its vertical axis, a supporting bracket means to which said top plate is affixed, a rotatable shaft journaled in said supporting bracket means to extend axially downward through the reservoir member interior, an upper agitator means affixed to said shaft, a bottom agitator and impeller means affixed to the lower end of said shaft, a plurality of circumferentially spaced valve controlled lubricant discharge devices leading from the bottom interior of said reservoir member, said bottom agitator and impeller means being adapted to impel lubricant outwardly through said discharge devices, lubricant applicator means dependent from the outlet ends of said discharge devices along which discharged lubricant may flow by gravity to a place of use, and an insulating jacket enveloping the sides and bottom of said reservoir member.

7. A lubricator comprising a reservoir member, a top plate from which said reservoir member is suspended subject to rotative adjustment about its vertical axis, a supporting bracket means to which said top plate is affixed, a rotatable shaft journaled in said supporting bracket means to extend axially downward through the reservoir member interior, an electric motor mounted on said supporting bracket means, shaft driving transmission means actuated by said motor, lubricant agitator means within the reservoir member interior adapted to be driven by said shaft, and a plurality of circumferentially spaced valve controlled lubricant discharge devices leading from the interior of said reservoir member.

8. A lubricator comprising a reservoir member, a top plate from which said reservoir member is suspended subject to rotative adjustment about its vertical axis, a supporting bracket means to which said top plate is affixed, a rotatable shaft journaled in said supporting bracket means to extend axially downward through the reservoir member interior, an electric motor mounted on said supporting bracket means, shaft driving transmission means actuated by said motor, lubricant agitator means within the reservoir member interior adapted to be driven by said shaft, a plurality of circumferentially spaced valve controlled lubricant discharge devices leading from the interior of said reservoir member, and lubricant applicator means dependent from the outlet ends of said discharge devices along which discharged lubricant may flow by gravity to a place of use.

9. A lubricator comprising a reservoir member, an insulating jacket enveloping the sides and bottom of said reservoir member, a top plate from which said reservoir member is suspended subject to rotative adjustment about its vertical axis, a supporting bracket means to which said top plate is affixed, a rotatable shaft journaled in said supporting bracket means to extend axially downward through the reservoir member interior, an electric motor mounted on said supporting bracket means, shaft driving transmission means actuated by said motor, an upper agitator means affixed to said shaft in upwardly spaced relation to the bottom interior of the reservoir member, a bottom agitator and impeller means affixed to the lower end of said shaft contiguous to the bottom floor of the reservoir member, a plurality of circumferentially spaced valve controlled lubricant discharge devices leading from the bottom interior of said reservoir member, said bottom agitator and impeller means being adapted to impel lubricant outwardly through said discharge devices.

10. A lubricator comprising a reservoir member, an insulating jacket enveloping the sides and bottom of said reservoir member, a top plate from which said reservoir member is suspended subject to rotative adjustment about its vertical axis, a supporting bracket means to which said top plate is affixed, a rotatable shaft journaled in said supporting bracket means to extend axially downward through the reservoir member interior, an electric motor mounted on said supporting bracket means, shaft driving transmission means actuated by said motor, an upper agitator means affixed to said shaft in upwardly spaced relation to the bottom interior of the reservoir member, a bottom agitator and impeller means affixed to the lower end of said shaft contiguous to the bottom floor of the reservoir member, a plurality of circumferentially spaced valve controlled lubricant discharge devices leading from the bottom interior of said reservoir member, said bottom agitator and impeller means being adapted to impel lubricant outwardly through said discharge devices, and lubricant applicator means dependent from the outlet ends of said discharge devices along which discharged lubricant may flow by gravity to a place of use.

11. A lubricator as defined in claim 9 wherein an external sight cage having open opposite sides is provided at the outlet end of each lubricant discharge device.

12. A lubricator as defined in claim 10 wherein an external sight cage having open opposite sides is interposed between the outlet end of each lubricant discharge device and the applicator means dependent therefrom.

13. A lubricator comprising a reservoir member, supporting bracket means for suspending said reservoir member at a place of use, a rotatable shaft journaled in said supporting bracket means to extend downwardly through the reservoir member interior, an electric motor mounted on said supporting bracket means, shaft driving transmission means actuated by said motor, lubricant agitator means within said reservoir interior adapted to be driven by said shaft, and valve controlled lubricant discharge means leading from the interior of said reservoir member.

14. A lubricator comprising a reservoir member, supporting bracket means for suspending said reservoir member at a place of use, a rotatable shaft journaled in said supporting bracket means to extend downwardly through the reservoir member interior, an electric motor mounted on said supporting bracket means, shaft driving transmission means actuated by said motor, an upper agitator means affixed to said shaft in upwardly spaced relation to the bottom interior of said reservoir member, a bottom agitator and impeller means affixed to the lower end of said shaft contiguous to the bottom floor of the reservoir member, and valve controlled lubricant discharge means leading from the interior of said reservoir member.

15. In a lubricator as defined in claim 13, wherein the reservoir member is provided with an enveloping jacket of insulating material.

16. In a lubricator as defined in claim 14, wherein the reservoir member is provided with an enveloping jacket of insulating material.

WILBUR F. MERCIER.

REFERENCES CITED

The following references are of record in the file of this patent:

UNITED STATES PATENTS

| Number | Name | Date |
| --- | --- | --- |
| 1,585,186 | Crispen | May 18, 1926 |
| 1,783,472 | Hinricks | Dec. 2, 1930 |
| 1,855,516 | Gits | Apr. 26, 1932 |